(12) United States Patent
Simon

(10) Patent No.: US 7,066,084 B2
(45) Date of Patent: Jun. 27, 2006

(54) DEVICE FOR REDUCING THE VOLUME OF BOTTLE MADE OF PLASTIC MATERIAL

(76) Inventor: Lajos Simon, Tancsics Mihaily ut 33, H-2457, Adony (HU)

( * ) Notice: Subject to any disclaimer, the term of this patent is extended or adjusted under 35 U.S.C. 154(b) by 6 days.

(21) Appl. No.: 10/501,674

(22) PCT Filed: Dec. 20, 2002

(86) PCT No.: PCT/HU02/00159

§ 371 (c)(1),
(2), (4) Date: Jul. 16, 2004

(87) PCT Pub. No.: WO03/059606

PCT Pub. Date: Jul. 24, 2003

(65) Prior Publication Data

US 2005/0115420 A1    Jun. 2, 2005

(30) Foreign Application Priority Data

Jan. 16, 2002 (HU) .................................... 0200176

(51) Int. Cl.
*B30B 9/32* (2006.01)
(52) U.S. Cl. ............... 100/326; 100/265; 100/266; 100/288; 100/902
(58) Field of Classification Search .............. 100/92, 100/247, 251, 265, 266, 288, 305, 315, 317, 100/321, 326, 902
See application file for complete search history.

(56) References Cited

U.S. PATENT DOCUMENTS 3,544,258 A * 12/1970 Presant et al. ............. 222/192
5,832,818 A * 11/1998 Menzak, Jr. ................ 100/92

FOREIGN PATENT DOCUMENTS

| EP | 0 707 932 A | | 4/1996 |
| FR | 2668732 A1 | * | 5/1992 |
| FR | 2692190 A1 | * | 12/1993 |
| FR | 2 694 722 A1 | | 2/1994 |
| FR | 2709699 A1 | * | 3/1995 |
| FR | 2 712 230 A | | 5/1995 |
| JP | 09066526 A | * | 3/1997 |
| JP | 11077680 A | * | 3/1999 |

* cited by examiner

Primary Examiner—Derris H. Banks
Assistant Examiner—Jimmy Nguyen
(74) Attorney, Agent, or Firm—Fitch, Even, Tabin & Flannery; Norman N. Kunitz

(57) ABSTRACT

The apparatus according to the invention comprises a housing or frame for receiving the bottle, an element for fixing the bottle, a heating element surrounding part of the bottle and compressing means for compacting the softened bottle, wherein the housing or frame is constructed to receive the bottle with its mouth part upwards, the heating element or the part of the heating element surrounding the bottle is at most 60 mm high, and is arranged around the neck part of the bottle in its starting position and the fixing element is a sealable plug in the compressing means, to be fitted into the mouth of the bottle and having an air channel, the cross section of which is preferably adjustable, preferably with flow control means. The flow control means may be a valve.

13 Claims, 5 Drawing Sheets

DEVICE FOR REDUCING THE VOLUME OF BOTTLE MADE OF PLASTIC MATERIAL

CROSS REFERENCE TO RELATED APPLICATION

This application is the National Stage filing under 35 U.S.C. 371 of International Application No. PCT/HU02/00159, filed Dec. 20, 2002, and claims priority of Hungarian Patent Application P 0200176, filed Jan. 16, 2002.

BACKGROUND OF THE INVENTION

The invention relates to an apparatus for compacting empty plastic bottles, comprising a housing or frame, means for fixing the bottle, means for heating a part of the bottle and a press unit for compacting the softened bottle.

It is known that beverages and other food products are filled more and more often into plastic bottles for sale, and the manufacturers want to produce rather one-way bottles rather than repurchasable ones. Thus, these bottles are found in large amounts in waste yards or in nature, contaminating thereby the environment or increasing to a great extent the amount of waste.

A further problem is caused by the fact that the material of the plastics do not decompose, thus the damage caused by them is long-lasting.

In order to eliminate, at least partly, the above problem, a great number of suggestions were made for the domestic annihilation or compacting of such bottles.

The solution is not easy due to the fact that plastic bottles, as opposed to metal containers or boxes, regain a significant part of their volume after stopping of the compression. Thus, compacting can only be performed by using compacting and thermal effect simultaneously, wherein the thermal effect does not allow the bottles to increase their volume after ceasing of the compression, as a consequence of their elasticity. If, namely, bottles are compressed in their melted state, they do not change their form after cooling down.

Known bottle compactors generally comprise a housing or frame receiving the bottle, heating means and compressing means.

EP 0707932 discloses a bottle compactor containing a housing chamber designed to receive an empty bottle. The housing is provided with a resistor and a cursor, the end of which is formed like a fork engaging the plastic bottle at its neck part. The cursor with the fork compresses the heated and softened bottle from the upside down. The cursor can be operated manually by means of a lever.

FR 2694722 describes a portable device, wherein the power for compacting the bottle arranged in a housing having resistance heating is provided by a spring.

In the bottom of the apparatus described in FR 2668732, there is a separate heating chamber wherein air is heated by resistance heating and the heated air is pulsed by a fan into a volume containing the plastic bottle, which is compacted by a plate moved by motor driven spindles.

In all the above devices, the bottles are heated from below, and they are usually compressed from above. As a result, the folded plastic layers are irregular and, in this way, optimal compression can not be achieved.

In other devices, heating is provided along the whole length of the device and/or by means of a patron intruding into the bottle. Such an apparatus is described e.g. in FR 2692190. In this case, the above mentioned disadvantage, namely the irregular compacting is especially obvious and, in addition, the energy consumption increases significantly as well.

In FR 2712230 the disclosed apparatus has a closed housing with a central heater intruding into the bottle which is compressed both from top to bottom and from bottom to top. The disadvantage of this is the unnecessarily increased energy requirement of compression and, further on, it is complicated and expensive.

SUMMARY OR THE INVENTION

The object of the present invention is to provide a cheap and simple device for compacting empty plastic bottles to the maximum achievable degree and with a regulated, optimum compression rate.

Accordingly, the apparatus according to the invention comprises a housing or frame for receiving the bottle, an element for fixing the bottle, a heating element surrounding part of the bottle and compressing means for compacting the softened bottle, wherein the housing or frame is constructed to receive the bottle with its mouth part upwards, the heating element or the part of the heating element surrounding the bottle is at most 60 mm high, and is arranged around the neck part of the bottle in its starting position and the fixing element is a sealable plug in the compressing means, to be fitted into the mouth of the bottle and having an air channel, the cross section of which is preferably adjustable, preferably with flow control means. The flow control means may be a valve.

The compression means and the fixing element for the bottle is a lid or the like moving on vertical guide bars and compressing the bottle towards the base of the housing, by its weight. The lid can also be lifted and lowered by a spindle driven by an electric motor or by spring means.

Preferably, the diameter of at least one section of the plug is adjustable, being an elastic rubber or plastic sleeve and allowing the sealed closing of the mouth of the plastic bottle.

In a preferred embodiment, the height of the heating element does not exceed 60 mm in order to ensure the simultaneous melting only of a relatively thin layer. As a consequence, compacting takes place in regular, narrow bands providing thereby a fully compacted agglomerate.

According to another preferred embodiment, the height of the heating element is larger than 60 mm, but the device can be adjusted so that the bottle intrudes into the heating element only in a section shorter than 60 mm.

The apparatus according to the invention allows an efficient, regulated compacting of plastic bottles so that the bellows-like folding occurs on short sections. This can be achieved partly by the small-height heating element, partly by controlled compacting. Compacting can be controlled by changing the flow cross section of the airing duct in the plug.

From the viewpoint of controlled and efficient compacting it is also important that melting and pressing takes always place starting from the mouth piece of the bottle, so that the pieces of smaller diameter can be easily compacted into the following pieces of larger diameter.

In order to obtain maximum compacting, a preferred embodiment is provided with additional, mechanical compacting means.

Further details of the invention will be explained by means of embodiments illustrated in the enclosed drawings, wherein

DESCRIPTION OF THE PREFERRED EMBODIMENT

Figure 1:
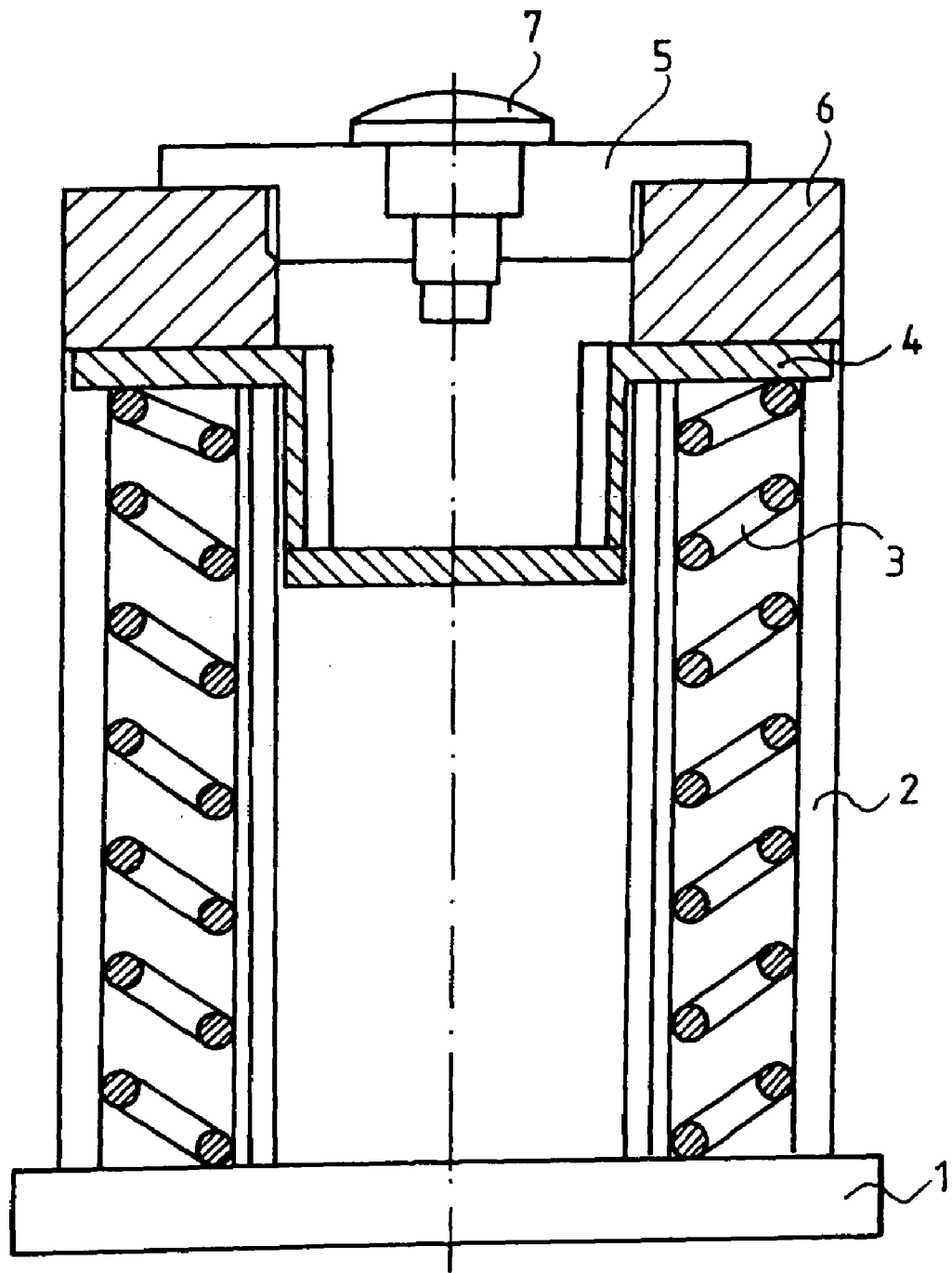
FIG. 1 is a section of a preferred embodiment of the invention.

The device shown in FIG. 1 comprises a base 1, a housing 2, spring means 3 and a bottle holder 4 in housing 2. Bottle holder 4 is kept in upper position by the spring means 3. At the upper part of housing 2, there are heating element 6 and lid 5.

In lid 5, there is a plug 7 with an air outlet channel 10 for allowing the air to flow out during pressing.

In use, the bottle 15 to be compacted is placed into the bottle holder 4, and pressed down together with it until impacting on the base 1. With screwing of the lid 5 into the heating element 6, the bottle is fixed, and then the plug 7 is sealed in the mouth-piece of the bottle. After starting the heating, spring means 3 presses the bottle upwards, and as the plastic melts in thin layers, it is compressed continuously to a bellow-like object until the compacting process ends by pressing the neck- and mouth-piece into the middle of the agglomerate.

Figure 2:
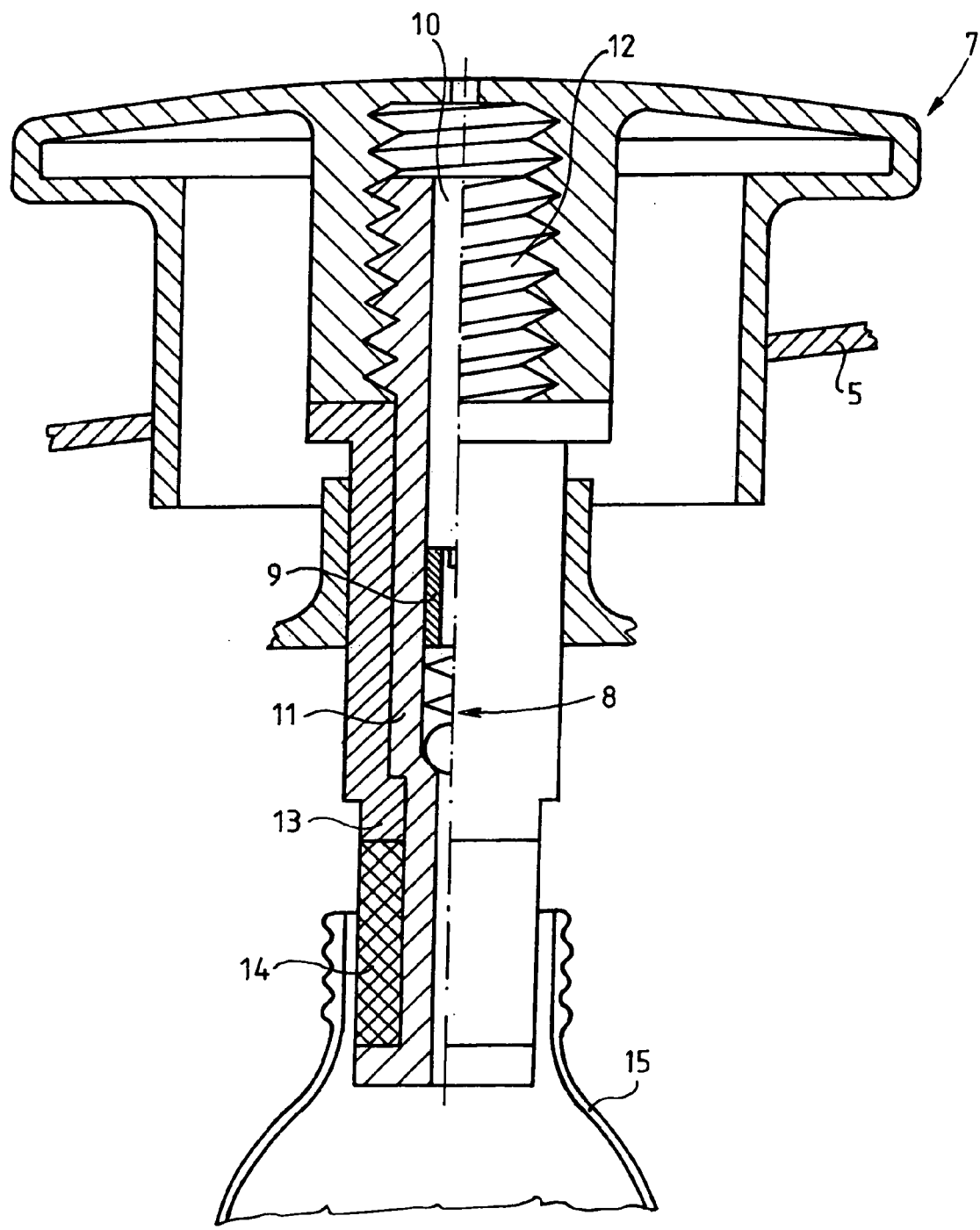
FIG. 2 is an enlarged section of the plug in the lid of the embodiment shown in FIG. 1.

FIG. 2 shows the plug 7 in lid 5. A threaded adjusting sleeve 9 and a ball valve 8 are arranged in the air outlet channel 10 of plug 7 for adjusting the free cross section of channel 10. Setting the appropriate spring force in ball valve 8 may be carried out by means of sleeve 9 so that it is drawn upwards or downwards by a screwdriver thereby controlling the amount and/or flow rate of the air.

Sleeve 9 is screwed into a tube 11 with a threaded section 12 at the upper end. In this way, tube 11 can be raised and lowered by turning the plug 7. When raised, an elastic sleeve 14 between an outer flange of the tube 11 and a bush 13 is compressed and, at the same time, its diameter increases. Thus, the mouth piece of the bottle 15 to be compacted is sealed. After this, air can flow out only through the air outlet channel 10, controlled by ball valve 8.

Figure 3:
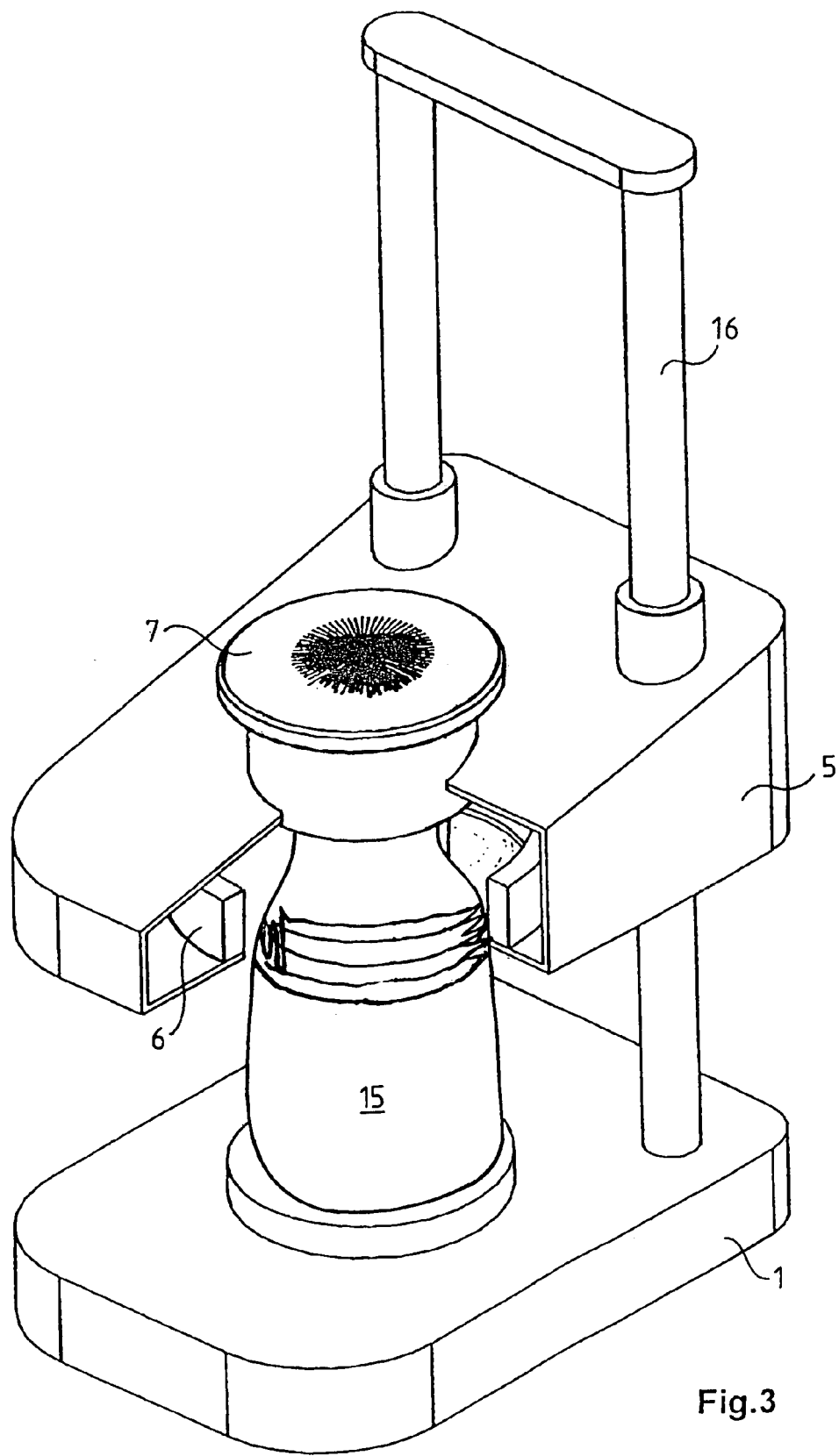
FIG. 3 is a partly sectioned view of another embodiment according to the invention during compacting.

Melting of a short section of the bottle 15 is performed by heating element 6 shown in FIG. 3, with reference to another embodiment of the invention. The height of heating element 6 is preferably smaller than 60 mm, in order to keep small the height of the section melted at once, thus making compacting uniform and regular.

The height of the heating element 6 can also be larger than 60 mm, in order to ensure an increased heating potential, but than only a section of it (preferably smaller than 60 mm) is used for direct melting of the bottle. In this case, bush 13 of the plug 7 seen in FIG. 2 is coupled to the lid 5 by an external thread to enable lowering the bottle 15 with respect to the heating element 6 in the lid 5. In this position, a section of the bottle 15 smaller than 60 mm is heated only.

In the embodiment shown in FIG. 3, lid 5 is movable on guide bars 16, and compacting power is gained from the weight of the lid. As a result, the bottle 15 is folded gradually in narrow bands, while air leaves through the air outlet channel 10 of the plug 7 in a controlled manner.

Figure 4:
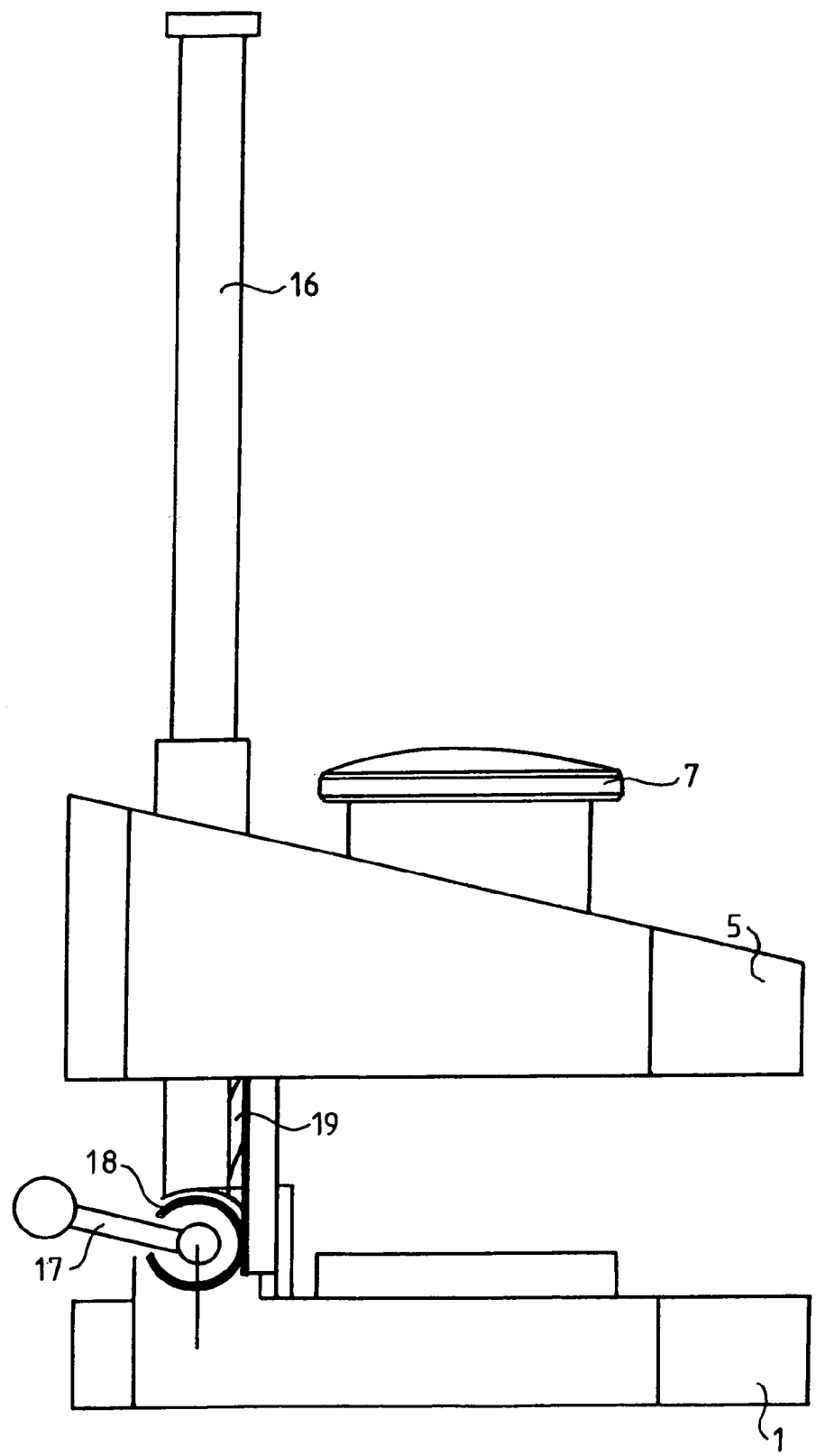
FIG. 4 shows part of an embodiment provided with a mechanical after-compactor.

FIG. 4 shows an embodiment in which the bottle compacted by the weight of the lid (5) can be further compacted by mechanical means. For this additional compacting a gear rim 18 is turned by means of a lever 17 on a gear rack 19 fastened to the lid 5. In this way, the agglomerate of the bottle 15 is further compacted before it cools down. Though the compression in the examples shown above was provided by the weight of the lid, many other possible embodiments like spindles driven by electric motors can also be used for compacting the bottles.

It is to be noted that the above non limiting examples shown in the disclosure only illustrate the invention, it is obvious that a skilled person can make other variants without going beyond the scope of the claims enclosed. In these variants compacting can take place by any means of, the apparatus may be closed, or open like the one shown, and the lid may also have many different embodiments.

Figure 5:
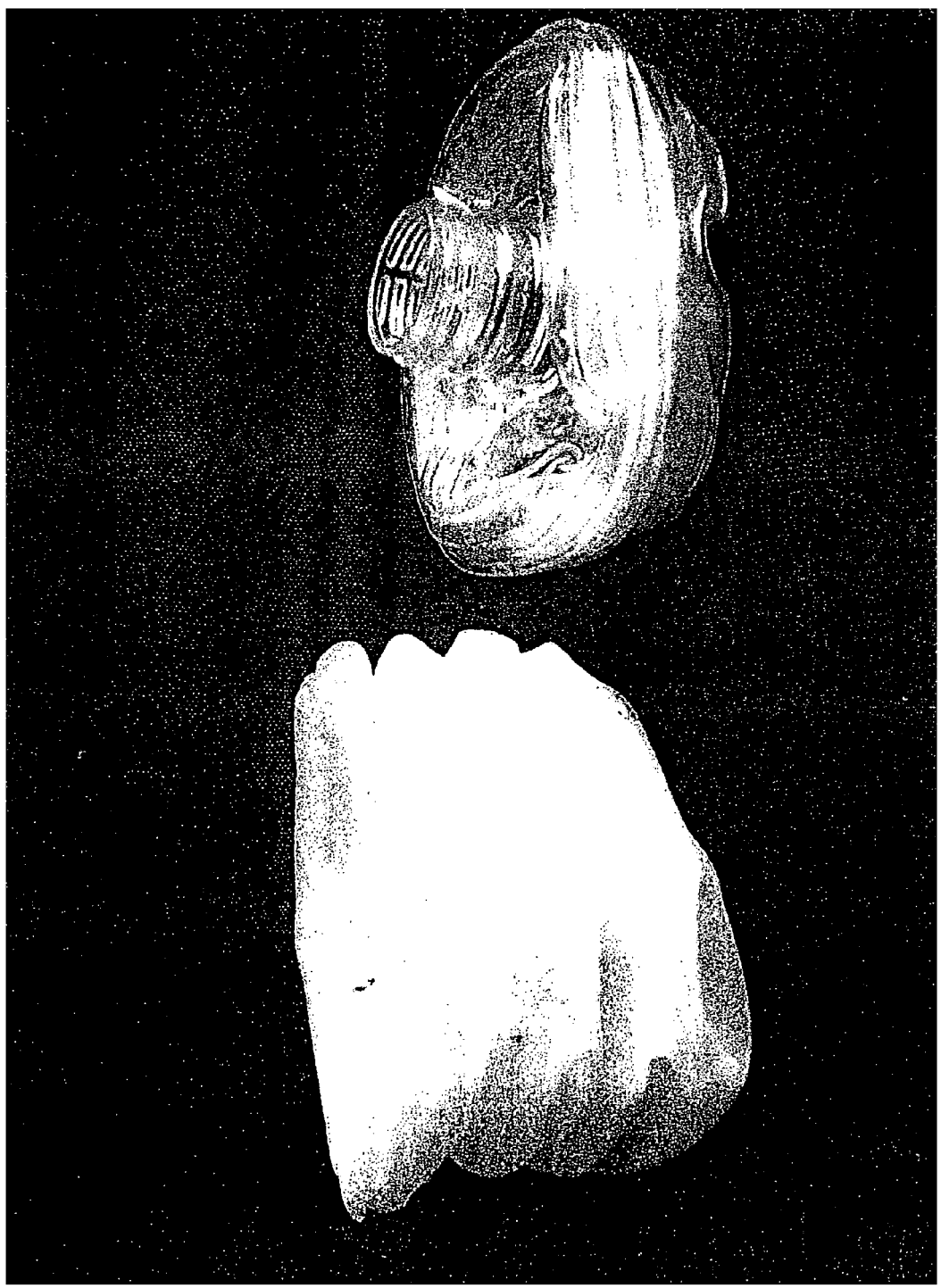
FIG. 5 a photo of a bottle compacted with the apparatus according to the invention compared with a bottle compacted by a traditional method.

The basic advantage of the device according to the invention is that, to the contrary of most known devices, compacting starts at the neck piece of the bottle, and narrow melted bands are produced during compaction. Moreover, the air flow-out can also be controlled to maintain optimal conditions for compacting. Due to these factors, the agglomerate has a regular shape and the smallest possible size, since the narrower sections disappear in the bellows-like folded parts. Thereby—as is shown in FIG. 5—the volume of the waste is significantly reduced as compared to the state of art. Furthermore, as it provides a simple and inexpensive way for compacting the bottles, the number of thrown away bottles loading the environment will also probably be reduced.

The invention claimed is:

1. Apparatus for compacting empty plastic bottles, comprising a housing or frame for receiving a bottle, an element for fixing the bottle, a heating element surrounding part of the bottle to soften the bottle, and compressing means for compacting the softened bottle, and the heating element is directly connected to the compressing means; wherein:
   the housing or frame is constructed to receive the bottle with a mouth part of the bottle upward;
   the heating element, or a part of the heating element surrounding the bottle, is at most 60 mm high, and is arranged only around a neck part of the bottle in its starting position; and
   the fixing element is a sealable plug that is located in the compressing means, that is to be fitted into the mouth of the bottle, and that has an air channel.

2. Apparatus according to claim 1 wherein the cross section of the air channel is adjustable.

3. Apparatus according to claim 1, wherein the compression means and the fixing element for the bottle are a lid moving on vertical guide bars.

4. Apparatus according to claim 3, wherein the lid compresses the bottle towards a base of the housing, solely by its weight.

5. Apparatus according to claim 1, wherein the compressing means includes a housing lid connected to the housing and in which the plug is mounted, and a bottle holder, which is moveable in a vertical direction in the housing, which is biased upwardly by spring means, and on which a bottle can be placed for movement with the bottle holder.

6. Apparatus according to claim 1, wherein in the air channel of the plug is provided with flow control means for controlling flow rate of air.

7. Apparatus according to claim 6, wherein the flow control means is a valve.

8. Apparatus according to claim 1, wherein the diameter of at least one section of the plug is adjustable.

9. Apparatus according to claim 8, wherein the section of adjustable diameter is an elastic rubber or plastic sleeve.

10. Apparatus according to claim 1, wherein the height of the heating element is at most 60 mm.

11. Apparatus according to claim 1, wherein the part of the heating element surrounding the bottle has a height of at most 60 mm.

12. Apparatus according to claim 1, wherein additional mechanical compacting means for additional compacting are provided.

13. Apparatus according to claim 12, wherein the additional mechanical compacting means is a gear rim that is engaged in a gear rack (19) on a back side of the lid for movement therewith, and wherein the gear rim is provided with a manually operated lever.

* * * * *